US010259353B2

United States Patent
Smith et al.

(10) Patent No.: US 10,259,353 B2
(45) Date of Patent: Apr. 16, 2019

(54) SCHOOL BUS SEAT

(71) Applicant: SynTec Seating Solutions, LLC, High Point, NC (US)

(72) Inventors: Michael Paul Smith, Davison, MI (US); Michael Bradley Glance, Dexter, MI (US)

(73) Assignee: SynTec Seating Solutions, LLC, High Point, NC (US)

( * ) Notice: Subject to any disclaimer, the term of this patent is extended or adjusted under 35 U.S.C. 154(b) by 73 days.

(21) Appl. No.: 14/694,021

(22) Filed: Apr. 23, 2015

(65) Prior Publication Data
US 2016/0311344 A1  Oct. 27, 2016

(51) Int. Cl.
*B60N 2/24* (2006.01)
*B60N 2/58* (2006.01)
*B60N 2/68* (2006.01)

(52) U.S. Cl.
CPC ........... *B60N 2/242* (2013.01); *B60N 2/5825* (2013.01); *B60N 2/5833* (2013.01); *B60N 2/686* (2013.01)

(58) Field of Classification Search
CPC .... B60N 2/242; B60N 2/5825; B60N 2/5833; B60N 2/686
See application file for complete search history.

(56) References Cited

U.S. PATENT DOCUMENTS

| | | | | |
|---|---|---|---|---|
| 3,669,496 A | * | 6/1972 | Chisholm | A47C 5/12 297/448.1 |
| 4,789,201 A | * | 12/1988 | Selbert | B60N 2/5825 297/218.1 |
| 5,061,540 A | * | 10/1991 | Cripps | A44B 18/0076 24/444 |
| 5,085,487 A | | 2/1992 | Weingartner et al. | |
| 5,195,222 A | * | 3/1993 | Rink | A47C 31/023 24/581.1 |
| 5,503,454 A | * | 4/1996 | Sakamoto | B60N 2/686 297/218.1 |
| 5,820,221 A | * | 10/1998 | Greaves | A47C 3/16 297/378.14 |
| 5,827,547 A | * | 10/1998 | Burchi | B29C 44/1257 249/91 |
| 6,755,475 B1 | | 6/2004 | Tiesler et al. | |

(Continued)

FOREIGN PATENT DOCUMENTS

DE  102012011436 A1 * 12/2013 ............... B60N 2/68
EP    2154018 A1 *  2/2010 ........... B60N 2/4263

OTHER PUBLICATIONS

DE 102012011436 A1, Description—machine translation.*
EP 2154018 A1, Description—machine translation.*

*Primary Examiner* — David R Dunn
*Assistant Examiner* — Tania Abraham
(74) *Attorney, Agent, or Firm* — Raggio & Dinnin, P.C.

(57) ABSTRACT

A bus seat for use in a bus comprises a base having a generally rectangular shape when viewed from a bottom. The bus seat further comprises a cushioning material arranged over a top and front portion of the base. The bus seat further comprises a cover material having a fastener with a first end and a second end attached thereto. The first end of the fastener is attached to the cover material while the second end of the fastener is connected to a predetermined portion of the base on a bottom surface thereof.

20 Claims, 13 Drawing Sheets

(56) References Cited

U.S. PATENT DOCUMENTS

| | | | |
|---|---|---|---|
| 6,786,785 B2* | 9/2004 | Woolley | B63B 1/248 |
| | | | 297/468 |
| 7,250,091 B2 | 7/2007 | Gupta et al. | |
| 7,445,292 B2 | 11/2008 | Moule | |
| 7,585,030 B2 | 9/2009 | Galbreath et al. | |
| 8,096,620 B2 | 1/2012 | Wilson et al. | |
| 8,328,279 B2* | 12/2012 | Brncick | B60N 2/5816 |
| | | | 297/228.11 |
| 8,398,142 B2* | 3/2013 | Stark | B60N 2/3013 |
| | | | 296/65.05 |
| 8,696,059 B2 | 4/2014 | Carmichael, IV | |
| 8,696,067 B2 | 5/2014 | Galbreath et al. | |
| 8,782,835 B2* | 7/2014 | Pozzi | B64D 11/0647 |
| | | | 244/118.6 |
| 2007/0262630 A1* | 11/2007 | Sawada | B60N 2/682 |
| | | | 297/378.12 |
| 2011/0018329 A1 | 1/2011 | Galbreath et al. | |
| 2012/0256466 A1 | 10/2012 | Lievestro et al. | |
| 2013/0257133 A1* | 10/2013 | Reedy | B60N 2/68 |
| | | | 297/452.38 |
| 2013/0313876 A1* | 11/2013 | Perrin | B60N 2/24 |
| | | | 297/344.13 |
| 2015/0165947 A1* | 6/2015 | Clauser | B60N 2/5825 |
| | | | 297/452.18 |
| 2015/0239380 A1* | 8/2015 | Sugiyama | B60N 2/646 |
| | | | 297/452.18 |
| 2016/0023765 A1* | 1/2016 | Zheng | B64D 11/0619 |
| | | | 297/342 |

* cited by examiner

SCHOOL BUS SEAT

BACKGROUND OF THE INVENTION

1. Field of the Invention

The invention generally relates to bus seats, and more particularly relates to an EPP cushion in a school bus seat for easy removal and installation into a bus.

2. Description of Related Art

Bus seats have been known for many years in the prior art. Many prior art bus seats have seat back trim that is affixed to a frame of the bus seat by a stapling operation to a plywood base of the seat back. The same arrangement is generally used for the seat cushion, such as utilizing rebond foam or polyurethane foam which have a predetermined thickness attached to a plywood board for structural stiffness and comfort of a school bus seating cushion. After attaching the foam to the plywood board, a cover material is attached to the seat cushion foam via a stapling operation. In addition, these prior art seat bus seat cushions typically utilize steel latching hardware to maintain attachment of the seat cushion assembly to the seat frame. This prior art setup of steel latching hardware often weighs in access of ten pounds, thus creating a heavy and hard to replace seating system. Generally, these bus seat back covers and bus seat cushions are made of a vinyl material. Furthermore, these prior art bus seats also use a seat trim cover for the cushion portion of the seat that is affixed to the cushion utilizing a staple gun that attaches the trim cover to a plywood substrate. This prior art methodology of stapling has been used for many years. Many of these prior art bus seat cushions have manufacturing practices that do not clearly define the start and stop corner folds resulting in inconsistent final appearances for the bus seat cushions. Also, many of these prior art bus seat cushions are very challenging to service because the customer must cut off the old bus seat cushion cover trim and then re-staple a new bus seat cover over the cushion into the underlying plywood of the bus seat cushion. Furthermore, the time needed to service or replace the bus seat cover cushion or seat back is very time intensive and labor intensive. Furthermore, these prior art bus seat cushions are very heavy and make installation and maintenance of the bus seat very time and labor intensive.

Therefore, there is a need in the art for an improved school bus seat cushion. There also is a need in the art for a school bus seat cushion that is a minimum of forty percent lighter than the current cushion designs, thus reducing the overall seat assembly weight. Furthermore, there is a need in the art for a school bus seat cushion that nests inside the frame for increased securement in both lateral and fore/aft directions versus typical mounting configurations of the prior art. There also is a need in the art for a school bus seat cushions that provides an anti-submarine ramp, which may help properly position the occupant during a crash event or the like. There also is a need in the art for a school bus seat cushion that removes the need for special tooling to disassemble and reassemble the cover material arranged over the school bus seat cushion, thus making the replacement more efficient and less time consuming.

SUMMARY OF THE INVENTION

One object of the present invention may be to provide an improved bus seat.

Another object to the present invention may be to provide an improved school bus seat cushion system.

Still another object of the present invention may be to provide a school bus seat cushion that utilizes an expanded polypropylene (EPP) cushion substrate or base in place of the prior art foam and board configuration, the EPP may reduce the weight of the overall seat assembly.

Yet another object of the present invention may be that it provides for a school bus seat cushion that nests inside of a frame for increased securement in both lateral and fore/aft directions versus prior art bus seats.

Still another object of the present invention may be that it provides a school bus seat cushion that provides an anti-submarine ramp, which may help properly position the occupant during an accident or other event.

Still another object of the present invention may be that it provides for a school bus seat cushion that removes the need for special tooling to assemble, disassemble and reassemble the cover material making replacement more efficient and less costly.

Still another object of the present invention may be that it provides for a bus seat cushion that is easier to manufacture and requires less time for installation.

To achieve the foregoing objects and other advantages, a bus seat for use in a bus is disclosed. The bus seat comprises a substrate having a generally rectangular shape when viewed from the bottom. The bus seat also comprises a cushioning material arranged over a top and front portion of the substrate. The bus seat further comprises a cover material having a fastener with a first end and a second end, wherein the first end of the fastener is attached to the cover material, while the second end of the fastener is connected to a predetermined portion of the substrate.

One advantage of the present invention may be that it provides a novel and improved bus seat cushion.

Still another advantage of the present invention may be that it provides a novel and improved bus seat cushion system.

Yet another advantage of the present invention may be that it provides a bus seat cushion that is made of an EPP material thus reducing the weight of the bus seat cushion, making installation of the seat and maintenance of the bus seat cushion easier throughout the life of the bus.

Yet another advantage of the present invention may be that it provides a bus seat cushion that nests inside the frame of a bus seat for increased securement in both lateral and fore/aft directions.

Still another advantage of the present invention may be that it provides a bus seat cushion that provides an anti-submarine ramp thereon to help properly position the occupant during a crash event or the like.

Still another advantage of the present invention may be that it provides of a bus seat cushion that removes the need for special tooling to disassemble and reassemble the cover making replacement more efficient for the bus seat cushion users.

Yet another advantage of the present invention may be that it provides a bus seat cushion that is less costly to manufacture and install within a bus.

Still another advantage of the present invention may be that it provides for a bus seat cushion that reduces the time required to insert into a bus.

Yet another advantage of the present invention may be that the bus seat cushion reduces the amount of time needed to clean the bus floors.

Other objects, features and advantages of the present invention may become apparent from the subsequent description and the appended claims, taking in conjunction with the accompanying drawings.

DESCRIPTION OF THE EMBODIMENT(S)

Figure 1:
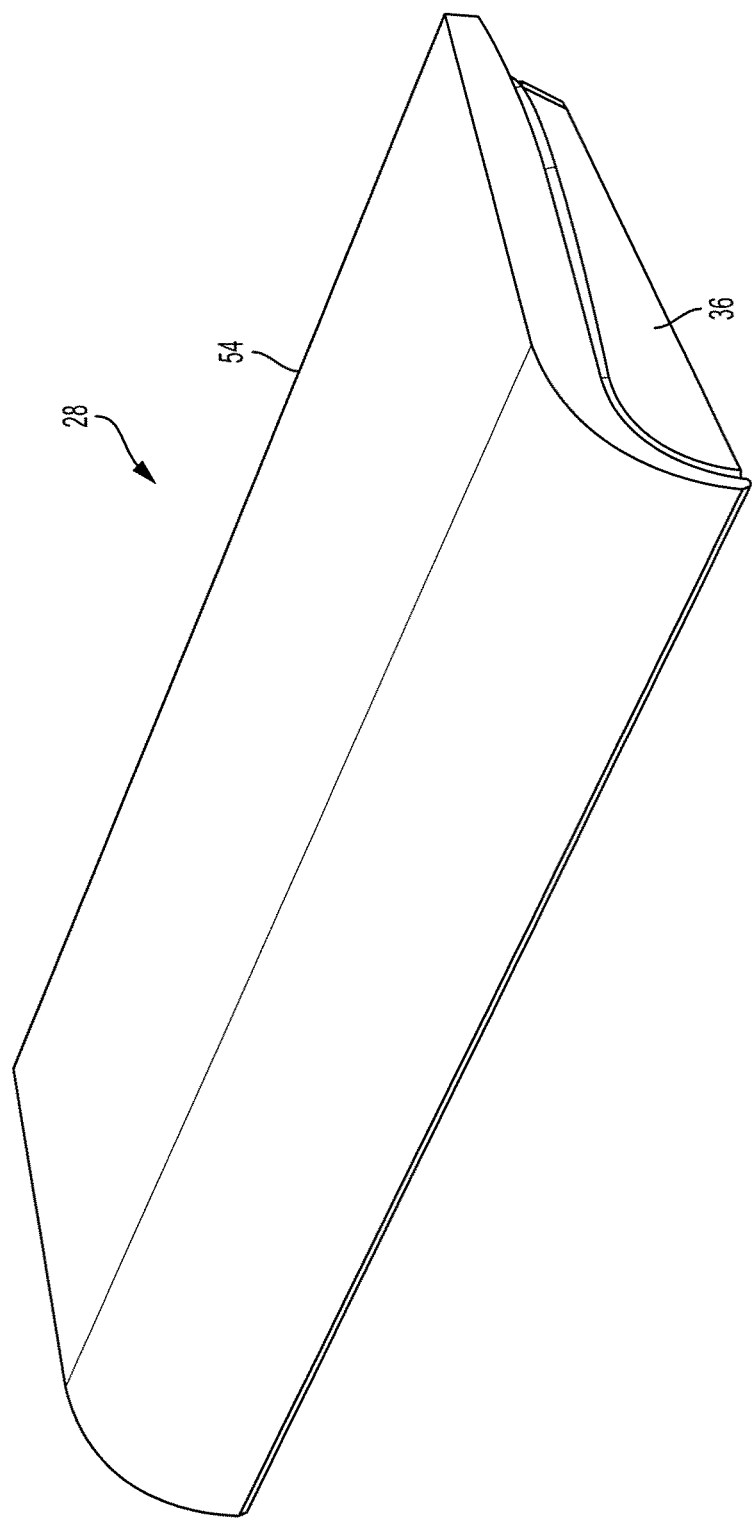
FIG. 1 shows a perspective view of a bus seat cushion according to the present invention.
Figure 2:
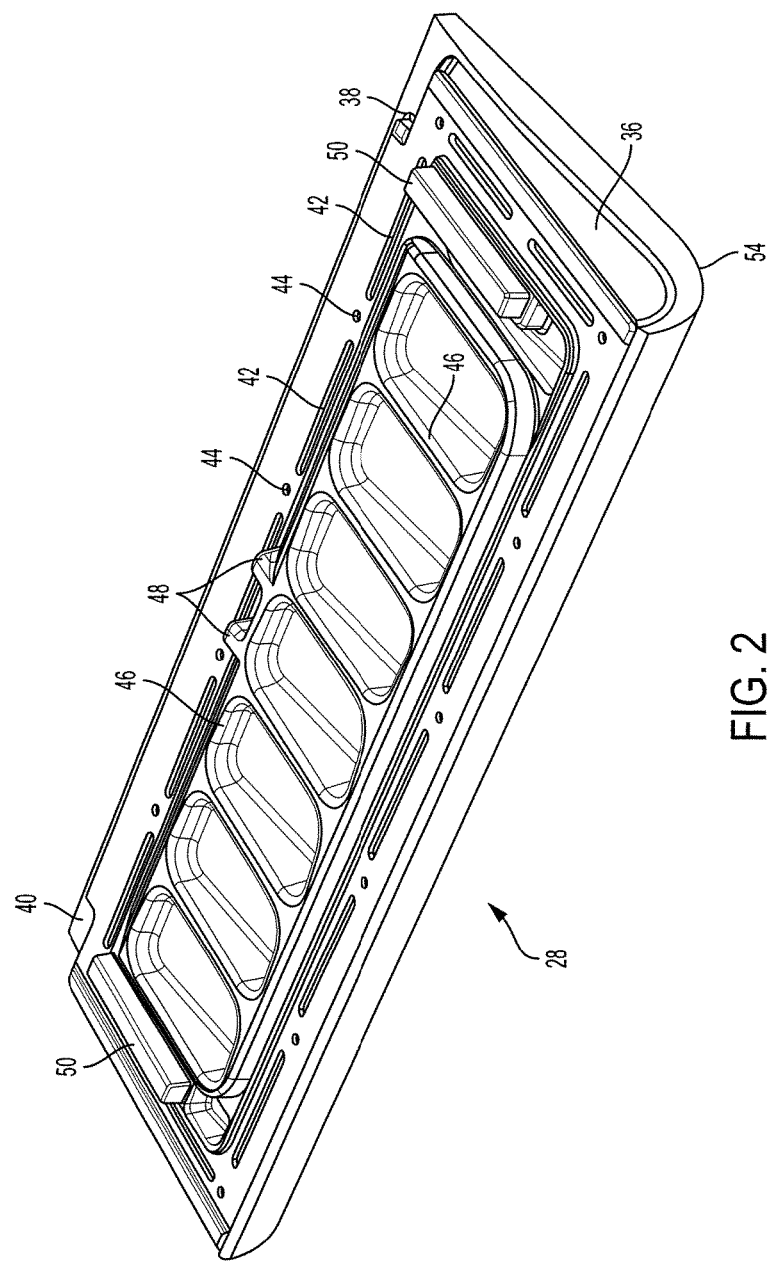
FIG. 2 shows a perspective bottom view of a bus seat cushion according to the present invention.
Figure 3:
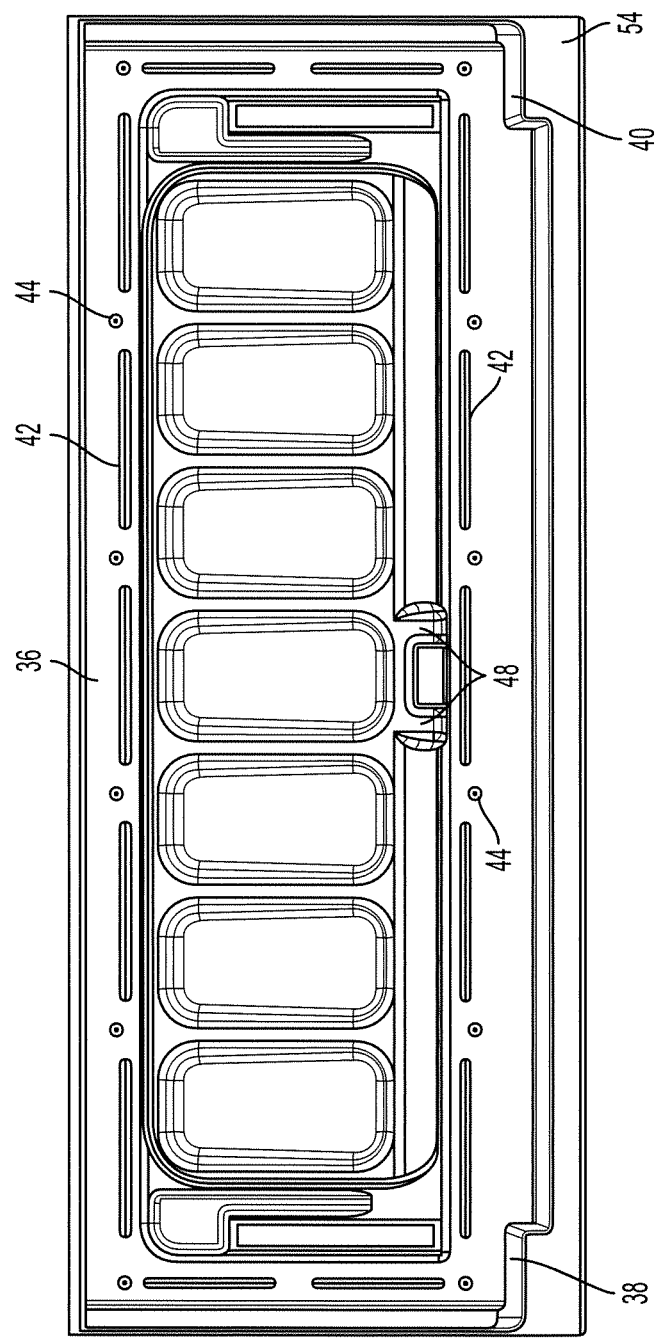
FIG. 3 shows a bottom view of a bus seat cushion according to the present invention.
Figure 4:
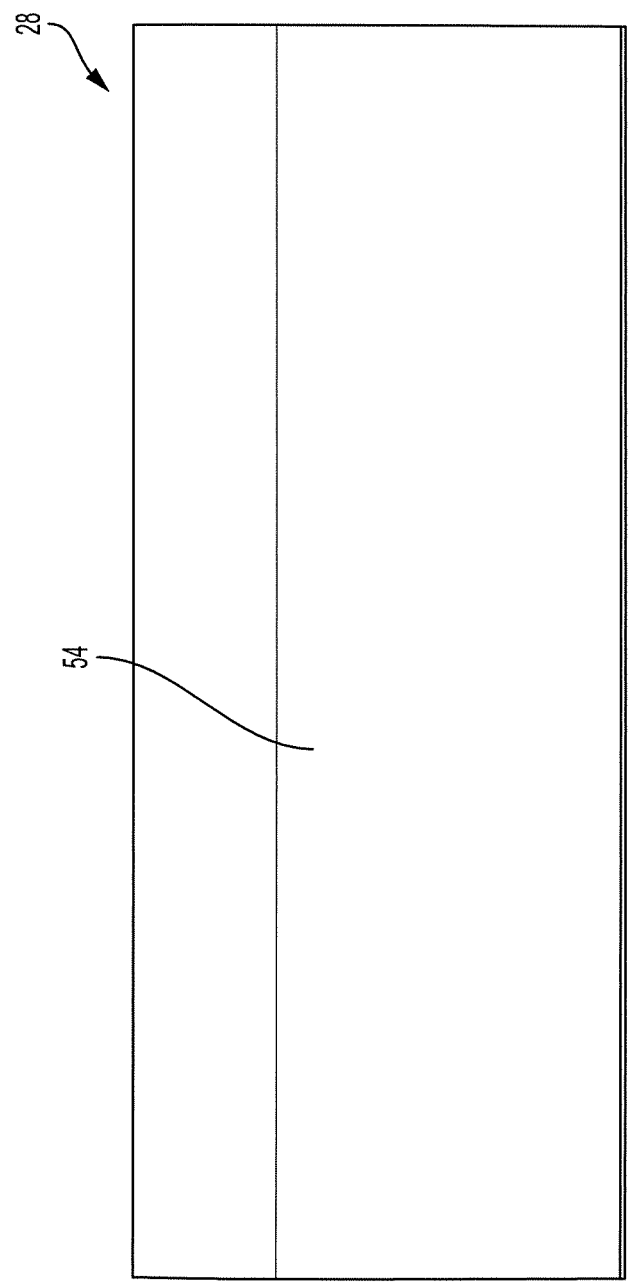
FIG. 4 shows a top view of a bus seat cushion according to the present invention.
Figure 5:
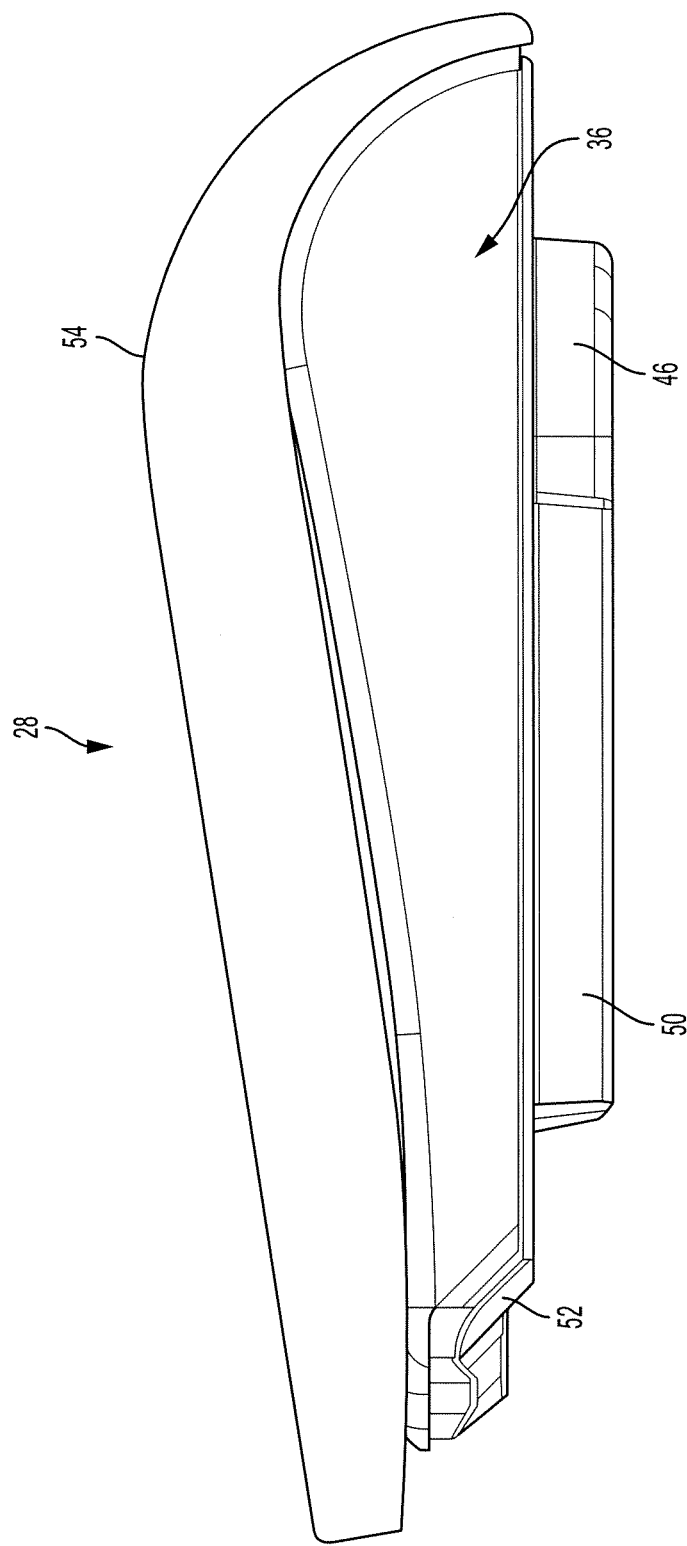
FIG. 5 shows a side view of a bus seat cushion according to the present invention.
Figure 6:
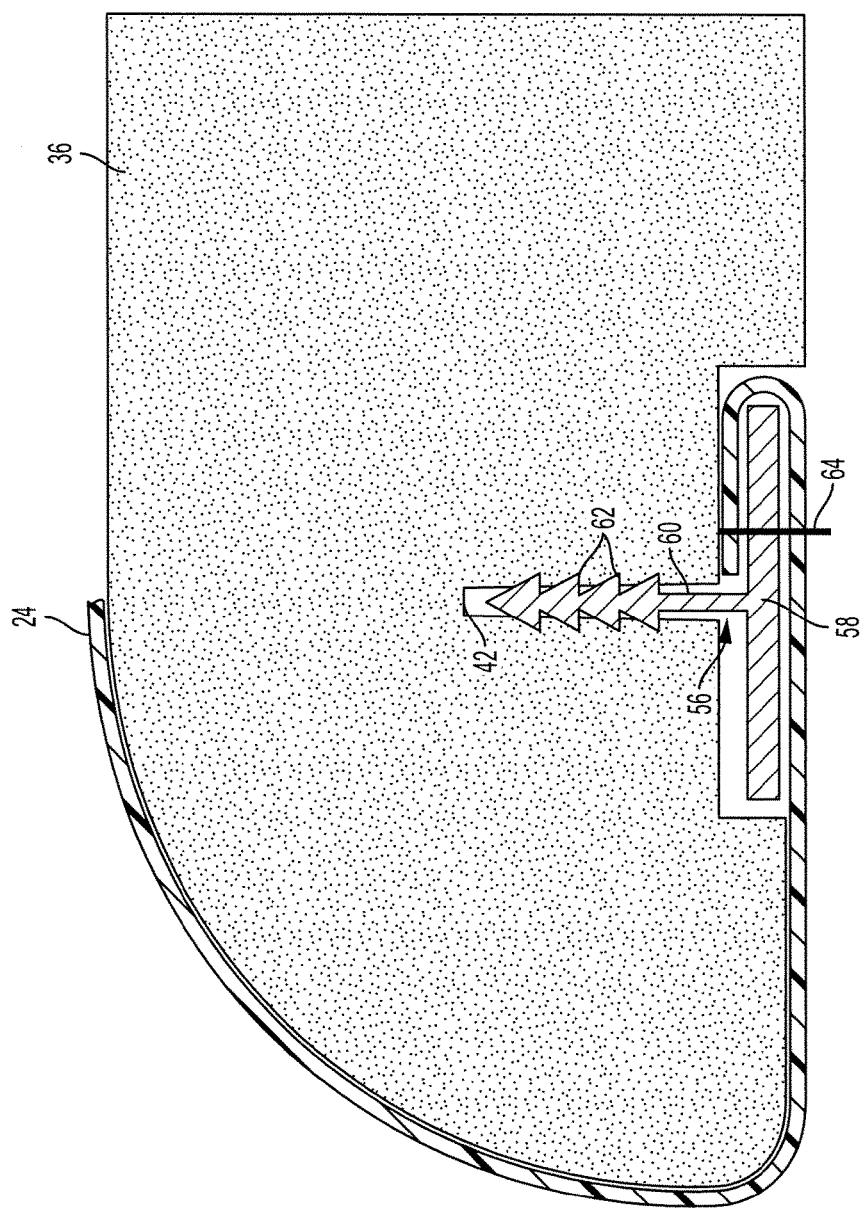
FIG. 6 shows a partial cross section of a bus seat cushion according to the present invention.
Figure 7:
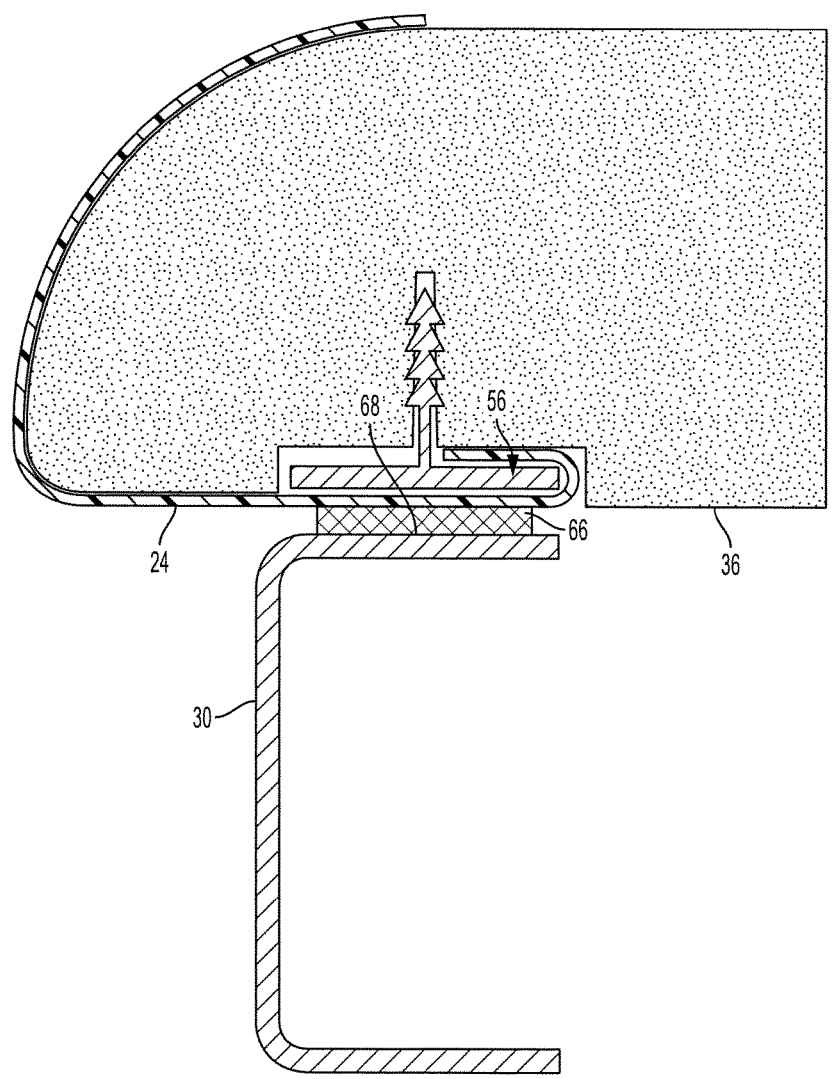
FIG. 7 shows a partial cross sectional view of an alternate embodiment of a bus seat cushion according to the present invention.
Figure 8:
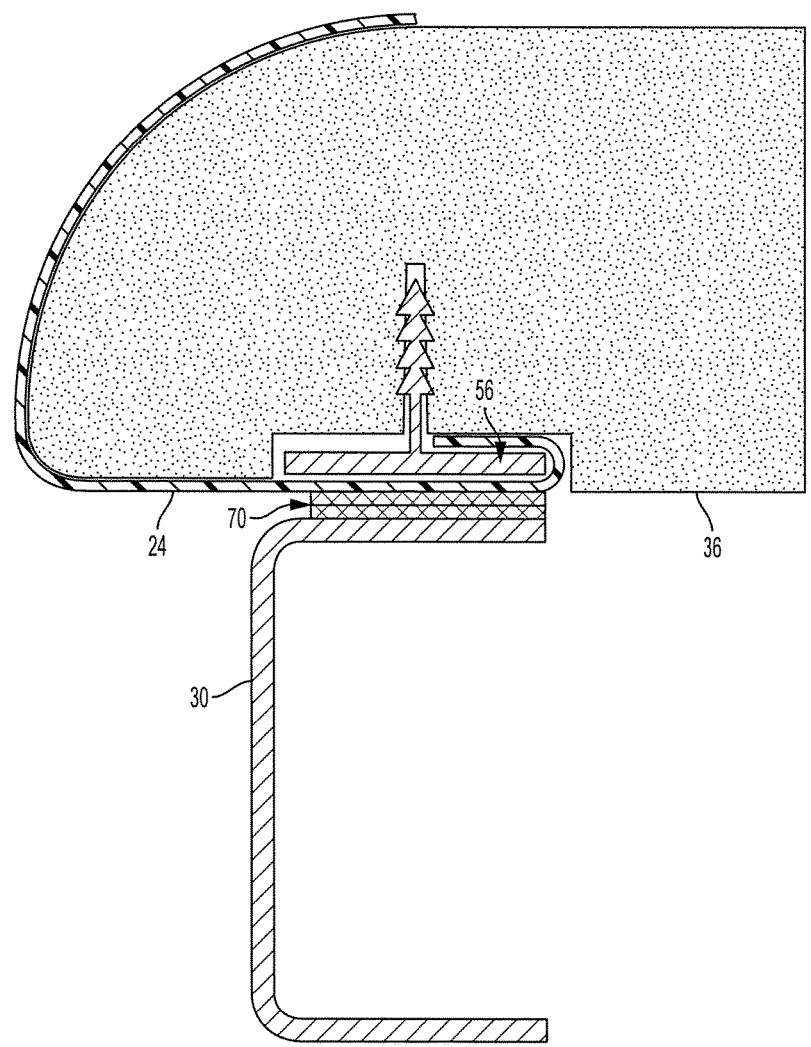
FIG. 8 shows a partial cross sectional view of an alternate embodiment of a bus seat cushion according to the present invention.
Figure 9:
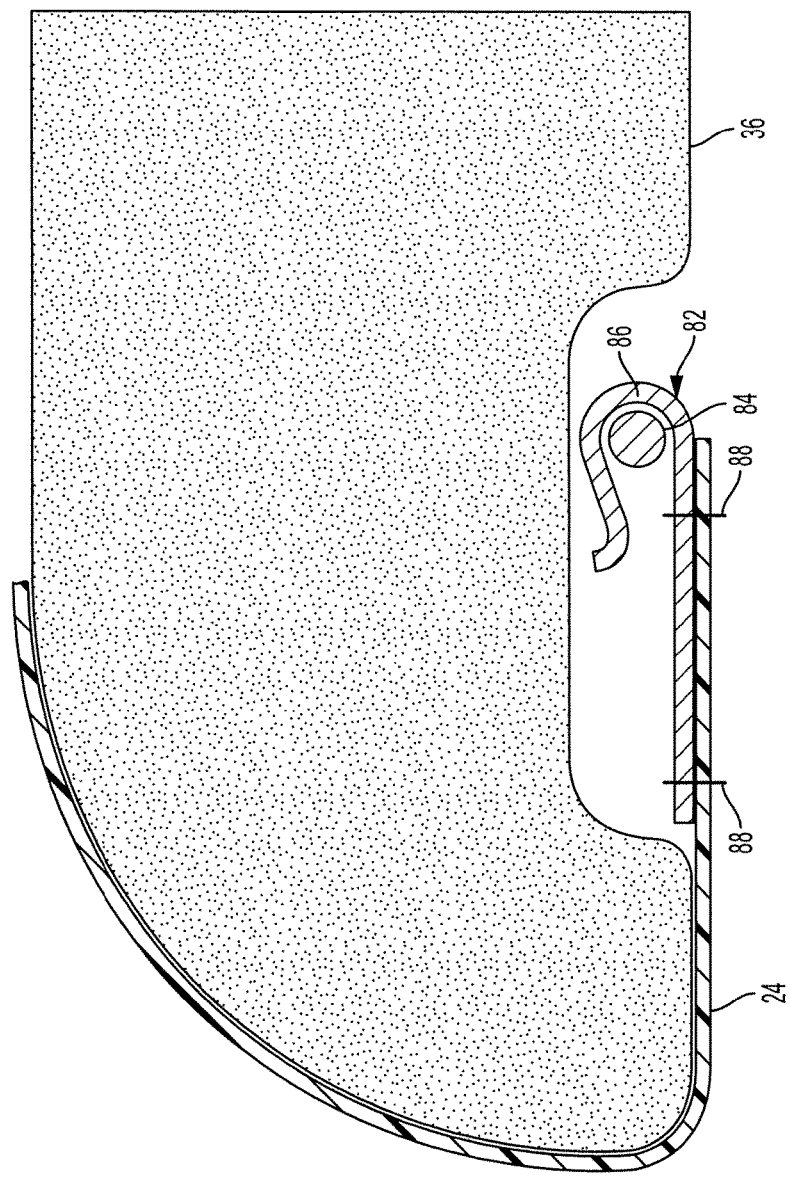
FIG. 9 shows a partial cross sectional view of an alternate embodiment of a bus seat cushion according to the present invention.
Figure 10:
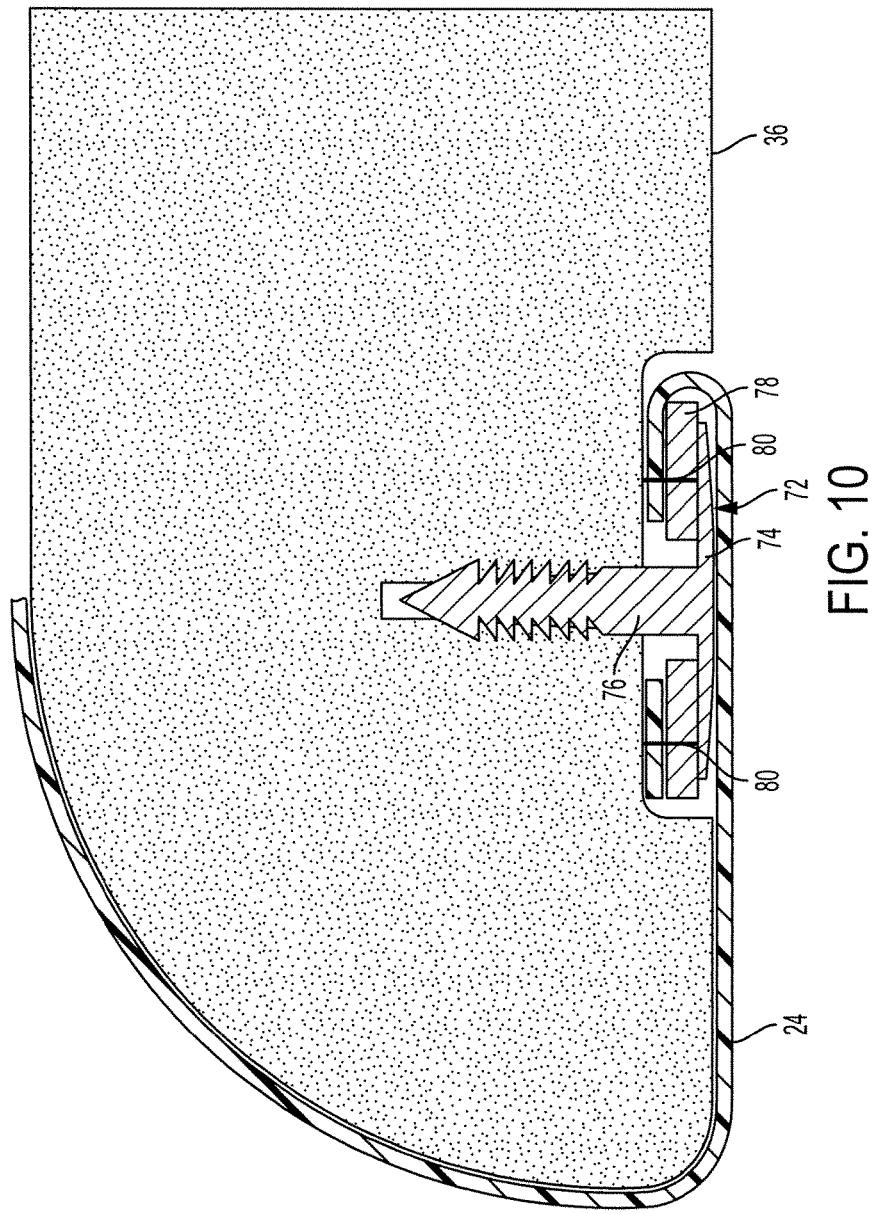
FIG. 10 shows a partial cross sectional view of an alternate embodiment of a bus seat cushion according to the present invention.
Figure 11:
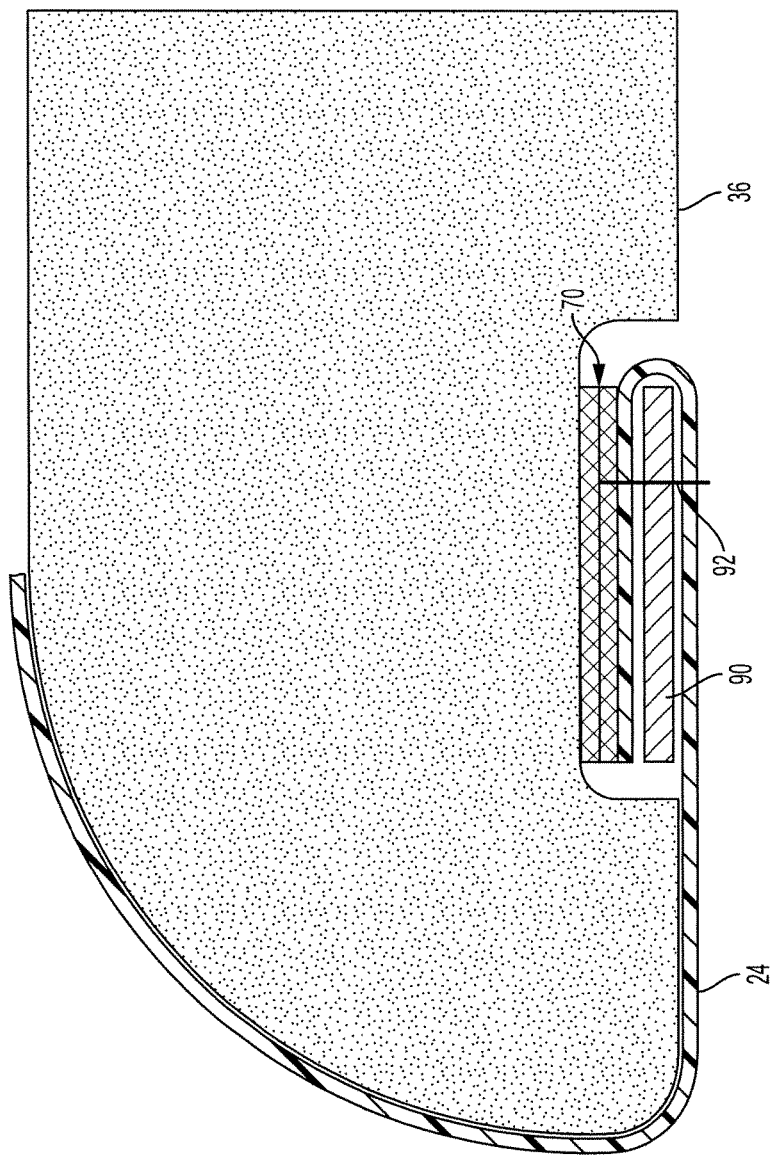
FIG. 11 shows a partial cross sectional view of an alternate embodiment of a bus seat cushion according to the present invention.
Figure 12:
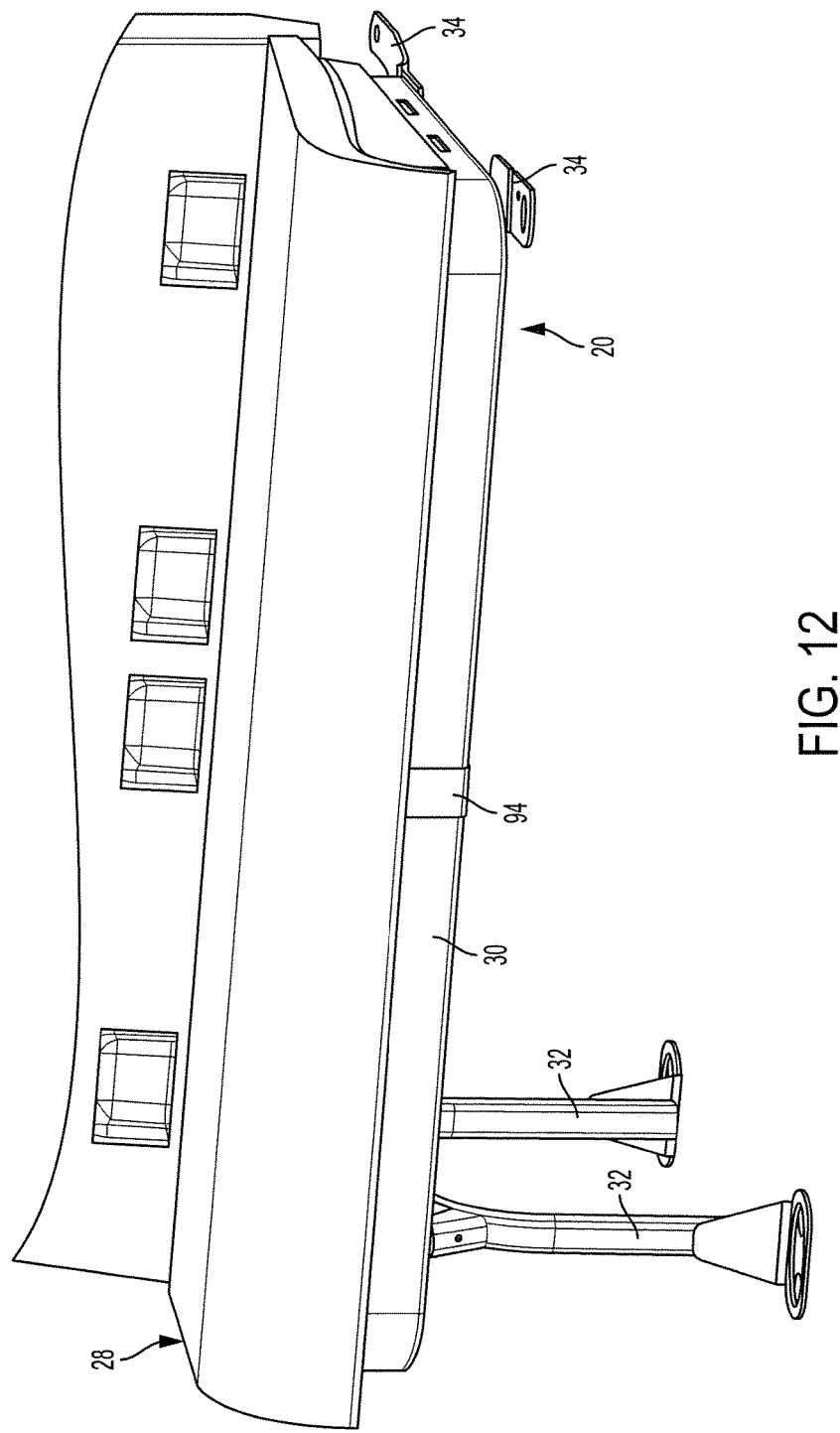
FIG. 12 shows a front view of a bus seat having a bus seat cushion according to the present invention.
Figure 13:
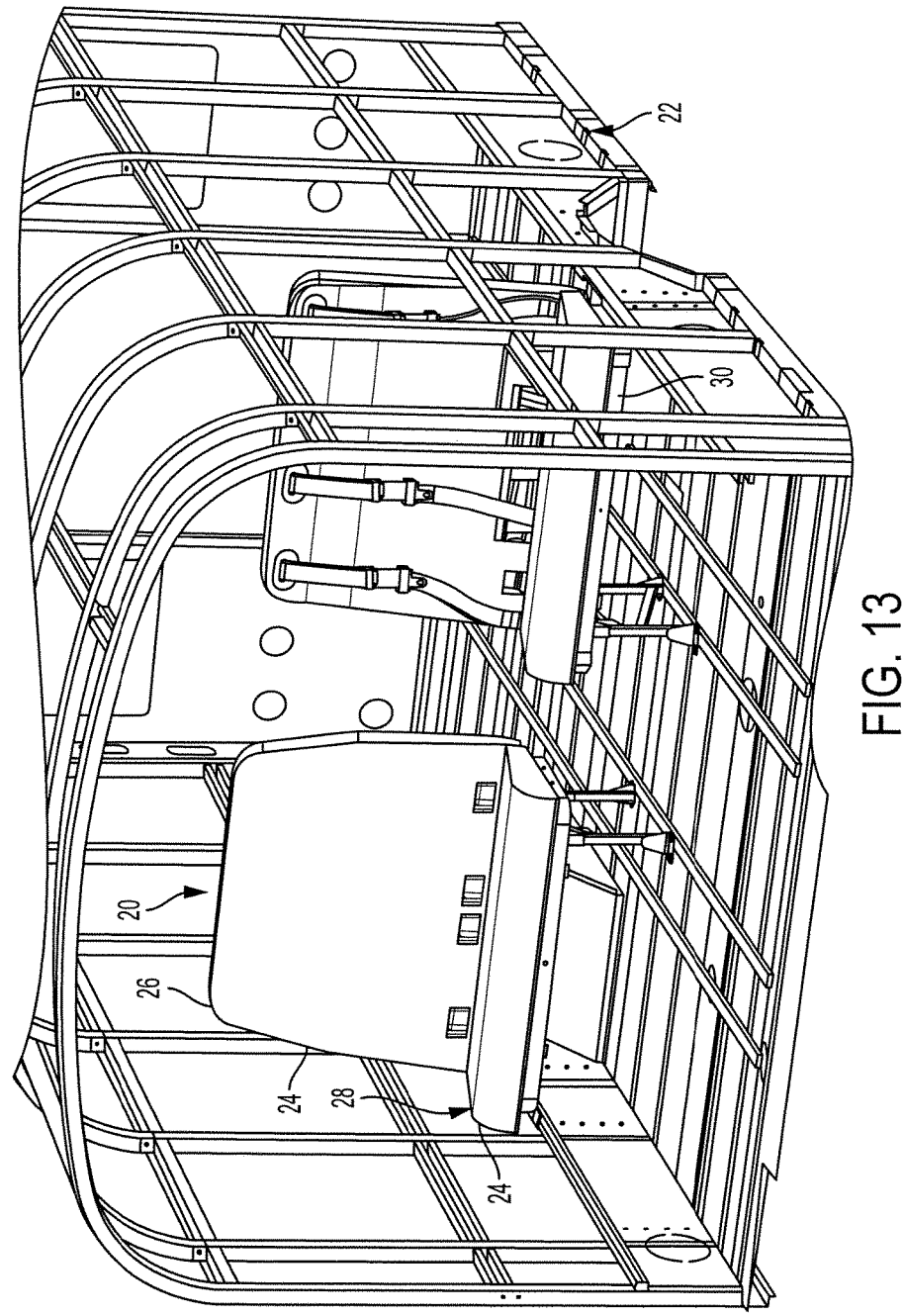
FIG. 13 shows a partial perspective view of a bus having the bus seat cushion and associated bus seat according to the present invention.

Referring to the drawings, a bus seat 20 for use in a bus 22 is disclosed. The bus seat 20 is for use in any known vehicle, such as a commercial bus, school bus, military bus or any other type of vehicle such as aeronautical, maritime or the like. The bus seat 20 is generally used in a school bus according to the present invention. The bus seat 20 is generally covered in a vinyl trim cover 24 material, however any other known fabric, such as cotton, a natural fabric, leather, or any other known covering for a seat may also be used for the bus seat 20 according to the present invention. The bus seat 20 may or may not include seat belts according to the present invention.

The bus seat 20, as shown in the Figures, generally includes a bus seat back 26 and a bus seat cushion 28. The bus seat back 26 and the bus seat cushion 28 are arranged and secured over or to a frame 30. The frame 30 is generally made of a metal material, however any other known material, such as a ceramic, composite, plastic, or natural material may also be used for the bus seat frame 30. In one contemplated embodiment the bus seat frame 30 is made of a steel material. The bus seat frame 30 may have a sub frame connected thereto, wherein the sub frame is made of any known material such as a plastic, a wood, any known natural material, a metal, a ceramic, composite, or any other material. The frame 30 generally has a rectangular shape and may include four legs or two legs 32 arranged on one end and two support brackets 34 arranged on an opposite end. The two support brackets 34 may be directly connected to a wall or ledge of the bus 22 while the two legs 32 of the frame 30 may be secured to the floor of the bus 20. The frame 30 may also include a plurality of reinforcement members or ribs extending between the two elongate or longest members of the seat frame 30. These ribs may be arranged at predetermined positions thereon. The frame 30 may also include a predetermined shaped orifice within the generally rectangular frame members, or it may have a plurality of orifices having predetermined shapes. These orifices may be designed to receive and secure a base or substrate 36 of the bus seat cushion 28. In one embodiment, the bus seat back 26 generally may have a sub frame connected to the frame 30 of the bus seat 20 for the back portion of the bus seat 20. The bus seat back 26 may also include a foam member, which is secured to a surface of the frame or sub frame in the back seat portion. It should be noted that in the embodiment shown, foam is used, however any other known material that has attributes of foam to create a comfortable bus seat may also be used according to the present invention for the bus seat back 26. After the foam member is secured to the sub frame or frame via any known fastening technique, such as but not limited to any known mechanical fastening technique or chemical fastening technique, a trim cover or material cover 24 may be arranged over the foam for the bus seat back 26. It should be noted that in one contemplated embodiment the foam may be recompressed to a predetermined compression and then have the trim cover 24 arranged thereover to keep a firm but stable seat back surface for the rider of the bus seat 20. Generally, the bus seat back trim cover 24 is affixed over the frame and cushion and any sub framing that the bus seat back 26 is secured thereon.

The bus seat cushion 28 of the present invention is shown in the figures. Generally, the bus seat cushion 28 incorporates a new design for a commercial school bus seating application that utilizes an expanded polypropylene (EPP) cushion base or substrate 36. The bus seat cushion 28 may have any known thickness. In one contemplated embodiment, the base 36 may be up to three inches thick. This EPP cushion base or substrate 36 may be used in place of the foam and board, which was used in prior art bus seat cushion applications. The cushion base 36 may help maintain structural integrity of the bus seat cushion 28. The base or substrate 36 generally may have a rectangular shape when viewed from a bottom. In one embodiment a first notch 38 is arranged at one corner of the base 36 and a second notch 40 is arranged at an opposite corner thereof. The base 36 may also include a plurality of grooves or slots 42 arranged at a predetermined depth into the base 36 bottom surface. The slots 42 generally are rectangular in shape and have a predetermined width and length. The slots 42 may be arranged in a generally rectangular pattern along or near a periphery of the base 36. In one contemplated embodiment, five slots 42 are arranged on each long edge of the base 36 and two slots 42 are arranged on each short edge of the base 36. It should be noted that the slots 42 may have any other known shape than the rectangular shape as shown. The slots 42 may be arranged in a linear pattern along each long edge and short edge of the bottom surface of the base 36. The slots or grooves 42 may have any known shape that is capable of receiving any known fastener therein. The base 36 may also include a plurality of orifices 44 arranged in a generally rectangular pattern in the bottom surface of the base 36. In one contemplated embodiment, six orifices are arranged along or near each long edge of the base 36. These orifices 44 generally have a circular shape in one contemplated embodiment, however any other shaped orifice may also be used for the contemplated bus seat cushion base 36. It should be known that any number of slots 42 or orifices 44 may be used for the current invention, not just the number shown and described in the application. The orifices 44 may have any known diameter and depth into the base 36 of the present invention. The orifices 44 are generally arranged in an alternating pattern with the slots 42 of the base 36. In one embodiment shown, the orifices 44 are arranged along a generally linear plane that is not the same plane as those of the slots 42. However, it is also contemplated to have the slots 42 and orifices 44 aligned on the same linear plane. It should further noted that in one contemplated embodiment the preferred material for the base or substrate 36 is EPP, however any other known plastic, metal, ceramic, composite or natural material may also be used for the base or substrate 36 of the bus seat cushion 28 according to the present invention. It is preferred but not required that any type of material used for the base 36 is capable of being molded.

The base 36 also may include a plurality of ribs 46 extending from a bottom surface there of. The plurality of ribs 46 are aligned in a generally large rectangular shape with cross bars or members arranged between the two larger ribs 46. This may form a plurality of generally rectangular orifices or cavities in the bottom surface thereof. At or near a mid point between the longitudinal length longer ribs are a first and second nub or finger 48 extending in an outer direction from the outside surface of one of the long ribs 46. Also, arranged near the outside edge of the base or substrate 36 is arranged a rectangular rib 50. The rectangular rib 50 may be arranged near or at both or one short outside edges. The rectangular rib 50 has a predetermined length and width and extends a predetermined distance from the bottom surface of the base 36. It should be noted that within each of the ribs 46 and defined by each of the ribs 46 may be generally a cavity surrounding the ribs 46 for use in receiving predetermined portions of the frame 30 to secure the bus seat cushion base 36 to the frame 30 of the bus seat 20. The bus seat cushion base 36 generally has a wing shape when viewed from a side or in cross section. The wing shape generally has a rounded leading or front edge and a narrow trailing or rear edge. The rounded leading edge has a predetermined arc which may increase the comfort of the bus seat user. The rear or trailing edge of the bus seat cushion base 36 may include a generally angular surface 52 with a predetermined angle arranged just below the top surface there. This predetermined angle may be used to help secure the bus seat cushion base 36 to the frame 30 of the bus seat 20. The top surface of the bus seat cushion base 36 may have a predetermined curve thereon. This predetermined curve provides an anti submarine ramp, which may help properly position the occupant and hold the occupant in the seat during an event or a frontal crash of the bus 22. It should be noted that any predetermined shaped curve or anti submarine ramp may be used on the top surface of the bus seat cushion base 36 according to the present invention. It is also contemplated to use a flat top surface for the bus seat cushion base 36 according to the present invention. It should further be noted that the bus seat cushion base 36 may have any known shape including any known length, width and thickness other than the rectangular shape shown and described herein. It should further be noted that the bus seat cushion base 36 may be made of any other known material other than EPP, such as but not limited to any other plastic, metal, ceramic, composite, or natural material. The bus seat cushion base 36 generally is molded into its predetermined shape, however it is also contemplated to have the grooves, slots and orifices machined or formed therein after initial creation of the overall shape of the bus seat cushion base 36.

The bus seat cushion 28 of the present invention also may include a generally thin layer of a spacer fabric, polyurethane foam, or rebond foam for providing a cushioning material 54. The cushioning material 54 in one contemplated embodiment is arranged over the front edge and top surface of the bus seat cushion base 36. However, in another contemplated embodiment the cushioning material 54 is arranged over all surfaces of the bus seat cushion base 36. In one contemplated embodiment the cushioning material 54 may have a thickness of approximately one inch, however any other thickness from a quarter inch up to ten inches may also be used for the cushioning material 54. The cushioning material 54 may have any known density and firmness depending on the design requirements for the bus seat 20. The cushioning material 54 also may have any known color. The cushioning material 54 may be secured to the bus seat cushion base 36 by any known chemical fastening technique or mechanical fastening technique. The chemical fastening technique of the preferred embodiment may include an adhesive arranged between the cushioning material 54 and the top surface and front edge of the bus seat cushion base 36. However, any other known chemical fastening techniques, such as epoxy, hot glue, et al., may also be used.

The bus seat cushion 36 of the present invention may also include a trim cover or cover material 24. In one contemplated embodiment the cover material 24 covers the top surface, front and back surfaces and both side edges of the bus seat cushion base 36 and cushioning material 54. The cover material 24 also may cover a predetermined portion of the bottom surface of the bus seat cushion base 36. However, it is also contemplated to have the cover material 24 cover the entire bus seat cushion base 36 and/or the cushioning material 54. As noted above, the cover material 24 is generally made of a vinyl material, however any other material as described above may also be used therein. The cover material 24 of the present invention generally may include at least one but preferably a plurality of fasteners attached thereto. The fasteners may be arranged at predetermined positions along an outer edge of the cover material 24. One end of the fastener may be secured to an edge of the cover material 24 and the other end of the fastener may be retained, interengaged, secured or held within a predetermined portion of the bus seat cushion base 36. The use of the fasteners may allow for the cover material 24 to be secured to the bus seat cushion base 36, such that the cover material 24 may be taut and may provide an aesthetically pleasing look and feel to the bus seat 20. It may also allow for the bus seat cover material 24 to be easier to replace and repair by removing the fasteners from attachment to the bus seat cushion base 36. Any known chemical or mechanical fastener may be used for the fastener of the present invention. In some contemplated embodiments the fasteners may include but are not limited to a hook and loop device, a push in device, or a J retainer system.

In one contemplated embodiment a push in device 56 is used as a fastener. The push in fastener 56 generally has a base 58 and an arm 60 extending at a right angle from the base 58. The arm 60 may have a plurality of teeth 62 extending in an outward direction therefrom. This plurality of teeth 62 may interengage with a slot 42 in the bottom surface of the bus seat cushion base 36. Inserting of the arm 60 into the slot 42 may secure the push in fastener 56 to the bus seat cushion base 36. The base 58 of the push in fastener 56 may have the cover material 24 arranged over one edge thereof. This may create a wrap around effect, such that the end of the cover material 24 is arranged and in contact with one side of the base 58 of the push in device 56 and another inside portion of the cover material 24 is arranged and in contact with the other side of the base 58 of the push in device 56. The cover material 24 may be secured to the base 58 of the push in device such that the end of the cover material 24 may be sewn to one part of the base 58 of the push in device 56 and also to another portion of the cover material 24. The cover material 24 generally forms a U around one edge of the base 58 of the push in device 56 and a thread 64 may be sewn, such as at a seam, between the end of the cover material 24, another part of the cover material 24 and through the entire thickness of the base 58 of the push in device 56. Generally, the push in device 56 may be made of a plastic material, however any other known material may also be used for the push in device 56. The use of the plastic material may allow for the thread 64 to be sewn and form a seam between the two portions of the cover material 24 and the base 58 of the push in device 56. This may secure the cover material 24 at a predetermined position with respect to the bus seat cushion base 36. It should be noted that any known material may be used for the thread 64 to form the seam between the push in device 50 and cover material 24. Also, the push in device 56 generally may have a rectangular shaped base 58, however a circular shaped base may also be used in other contemplated embodiments along with any other shaped base. In another contemplated embodiment the push in device 56 may also be used with a carrier 66. The carrier 66 may be sewn to the cover material 24 across from and adjacent to where the push in device 56 is sewn and secured to the cover material 24. The carrier 66 in one contemplated embodiment is made of a plastic material, however any other known material may also be used. The carrier 66 may have arranged and secured therein a magnet 68. The magnet 68 may be used to attach the bus seat cushion 28 to the seat frame 30, which is attached to the bus 22. Therefore, any known type of thread may be used to sew the carrier 66 for the magnet 68 to an outside surface of the cover material 24 according to the present invention. It should be noted that the carrier 66 generally is aligned with the base 58 of the push in device 56. In one contemplated embodiment a total of four magnets 68 may be used, two on the front edge and two along the back edge at predetermined positions, to secure the bus seat cushion 28 to the seat frame 30 according to the present invention. It is also contemplated to use one seam and one thread 64 to secure the two portions of the cover material 24 to the base 58 of the push in device 56 and also the carrier 66 to the outside surface of the cover material 24. However, two separate threads and seams may also be used, one to secure the carrier 66 to the cover material 24 and one to secure the push in device 56 to the cover material 24. It is also contemplated in another embodiment to sew one portion of a hook and loop fastener 70 to the outside surface of the cover material 24 in the same position as that of the carrier 66 as described above. The hook and loop fastener 70 may be secured to the outside surface either with a separate stitch through the cover material 24 or with the same stitch holding the cover material 24 to the base 58 of the push in device 56. The other portion of the hook and loop fastener 70 may then be secured to the seat frame 30 via any known chemical or mechanical fastening technique, such as but not limited to gluing, adhesive, epoxy, rivet, screw, or any other known fastening technique. This may allow for the bus seat cushion 38 to be secured via the interaction and interengagement between a hook and loop fastener 70 to secure the bus seat 20 in proper position with respect to the bus seat frame 30. The hook and loop fastener 70 generally may be of any known type, such as Velcro or any other commercially known brand. Any known number of hook and loop fasteners 70 may be arranged on the cover material 24 and/or the bus seat cushion base 36 to secure the bus seat cushion 28 to the seat frame 30. It should also be noted that any number of fasteners may be arranged along the front or back edge and side edges of the bus seat cushion base 36 in order to secure the cover material 24 securely thereto.

The bus seat cushion base 36 may also have another embodiment that includes a push in "tree" fastener 72 that includes a base 74 with an arm 76 as described above and also a washer 78 arranged over the arm and engaged with an inside surface of the base 74 of the push in "tree" fastener 72. The push in "tree" fastener 72 may have a generally circular shape base 74, however any other shape may also be used. In this embodiment, the washer 78 may be sewn to the cover material 24 with at least one seam 80, but preferably two seams. The cover material 24 may have an orifice arranged adjacent to one edge thereof and the arm 76 of the push in "tree" fastener 72 may be arranged through that orifice such that the cover material 24 may be arranged on both sides of the arm 76 of the push in "tree" fastener 72 and against both sides of the washer 78 of the push in "tree" fastener 72. Therefore, only the washer 78 may be secured to the two predetermined inside portions of the cover material 24 and then the push in "tree" fastener 72 may pass through the washer 78 into a slot 42 in the bottom surface of the bus seat cushion base 36. This may secure the cover material 24 at a predetermined position with relation to the bus seat cushion base 36. The teeth along the arm 76 of the push in "tree" fastener 72 may hold the push in "tree" fastener 72 securely to the bus seat cushion base 36. The use of these push in "tree" devices 72 may allow for easy removal of the cover material 24 for the bus seat cushion 28 to replace or repair the cover material 24 of the bus seat cushion 28.

In another contemplated embodiment of the present invention the fastener for use in the present invention to hold the cover material 24 to the bus seat cushion base 36 may include a J retainer system 82. The J retainer system 82 may include a trim wire 84 which has a predetermined diameter and length. The trim wire 84 may be made of any known metal, plastic, ceramic, composite or natural material. In one contemplated embodiment the trim wire 84 may be formed into the EPP foam of the bus seat cushion base 36. The trim wire 84 may then be made available for hooking a J retainer 86 in one of the cavities formed in the bottom surface of the bus seat cushion base 36. The J retainer 86 may have a generally J shape as any known J retainer in the prior art. The J retainer 86 generally may be made of a plastic material, however any other material, such as any other metal, ceramic, composite, plastic, or natural material may also be used. The long portion of the J retainer 86 generally may be sewn to an inside surface of the cover material 24. Any known sewing thread 88 and any number of seams may be used to secure the J retainer 86 to the inside surface of the cover material 24. It should also be known that any other mechanical or chemical fastening technique may be used to secure any of the fasteners described within this application to the cover material 24. In one contemplated embodiment sewing via the use of a thread is the preferred method of securing the fasteners to the cover material 24. A plurality of J retainers 86 may be used at predetermined locations to secure the cover material 24 to a single or plurality of trim wires 84 arranged and molded directly into the bottom surface of the bus seat cushion base 36.

Another embodiment of a fastener for use in the present invention may include a hook and loop fastener 70. The hook and loop fastener 70 may have one portion thereof secured to a predetermined bottom surface of the bus seat cushion base 36. It is contemplated to use any known mechanical and chemical fastening technique to secure the one portion of the hook and loop fastener 70 to the bus seat cushion base 36. Such fastening techniques may include but are not limited to epoxy, glue, adhesives, rivets, nails, screws, etc. The other portion of the hook and loop fastener 70 may then be sewn to an outside surface of the cover material 24 at or near an end of the cover material 24. In one contemplated embodiment, the cover material 24 may fold over an insert device 90 arranged adjacent to the hook and loop fastener 70. The insert device 90 may be used as a stiffener to help firm up the bottom loop piece of the hook and loop fastener 70 in order to secure itself to the top hook piece of the hook and loop fastener 70. The insert device 90 generally is made of a plastic material, however any other material may also be used for the insert device 90. The insert device 90 generally may have a rectangular or square shape to mimic that of the shape of the hook and loop fastener 70. The hook and loop fastener 70 may have any known shape, such as but not limited to rectangle, square, triangular, circular, etc. In one contemplated embodiment the seam 92 may be sewn between the two layers of the cover material 24 arranged over the insert 90 and the insert 90 itself along with the loop portion of the hook and loop fastener 70. Therefore, this thread 92 may be passed through four different components to secure the loop portion of the fastener 70 to the end of the cover material 24. The cover material 24 then may be secured to the bus seat cushion base 36 via a plurality of hook and loop fasteners 70 arranged at predetermined positions along both the long edges and short edges of the bus seat cushion base 36.

It is also contemplated in one embodiment to use an attachment device 94 to secure the bus seat cushion 28 to the seat frame 30. In one embodiment, the attachment device 94 may be secured to a predetermined portion of the cover material 24 of the bus seat cushion 28 on one end thereof and to the bus seat frame 30 on the opposite end thereof. The attachment device 94 may be made of webbing, plastic, metal, composite, natural material, etc. The attachment device 94 may be secured to the bus seat frame 30 by any known chemical or mechanical fastening technique and may be attached to the cover material 24 by any known mechanical or chemical fastening techniques, such as but not limited to sewing, gluing, adhesives, or the like. This may secure the bus seat cushion 28 to the seat frame 30 in one contemplated embodiment. It is also contemplated to secure the bus seat cushion 28 to the frame 38 via the ribs 46 extending from the bottom surface of the bus seat cushion base 36 and the frame members arranged at predetermined positions on the bus seat frame 30. These frame members and the ribs of the bus seat cushion base 36 may interact with each other in an interference fit or press fit arrangement to secure the bus seat 20 in both a lateral and fore and aft direction with relation to the bus seat frame 30 and the bus seat cushion 36. It is also contemplated to use a combination of the ribs 46 and bus seat frame members along with an attachment device 94 to secure the bus seat cushion 38 to the bus seat frame 30.

In operation, the bus seat cushion 28 may be assembled such that the cover material 24 is arranged thereover and the bus seat cushion 28 is secured into the bus seat frame 30 by pushing the bus seat cushion 28 in a downward direction, such that interengagement occurs between the ribs 46 on the bottom surface of the bus seat cushion base 36 and the frame members of the bus seat frame 30. This may secure the bus seat cushion 28 in both a lateral and fore and aft direction with relation to the bus seat frame 30. To disassemble or reassemble the cover material 24 the bus seat operator may pull up on the bus seat cushion 28, which may remove the fasteners from the bus seat cushion base 36 and replace or fix the cover material 24 and then reattach the cover material 24 to the bus seat base 36 via fasteners and then reinsert the bus seat cushion onto the bus seat frame 30 to perform a quicker and less time consuming repair and replacement of a bus seat cushion 28 for the present invention. It is also contemplated to have the bus seat cushion 28 attached to the seat frame 30 via a plurality of hook and loop type fasteners 70 attached and arranged between the cover material and/or the bus seat cushion base 36 and the frame 30, thus allowing for a generally Velcro type attachment between the bus seat cushion 28 and the bus seat frame 30. Another alternative to attach the bus seat cushion 28 to the frame 30 via the attachment device 94 as described above, which may have a webbing 94 attached to the cover material 24 and the seat frame 30 to secure the bus seat cushion 28 to the seat frame 30. Any combination of the press fit option, the hook and loop fastener option or an attachment device 94 alternative may be used alone or in conjunction with each other to secure the bus seat cushion 28 to the seat frame 30 of the present invention. The use of this new bus seat cushion 28 may reduce the weight by a minimum of forty percent over the current prior art cushion design, which will reduce the overall seat assembly weight. The ability of the invention to nest inside the bus frame for securement both lateral and in the fore and aft direction also provides a more secure seating surface for occupants of the bus seat.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A bus seat for use in a bus, said bus seat comprising:
   a substrate having a bottom with a generally rectangular shape, said substrate having a plurality of ribs extending from said bottom surface of said substrate, said plurality of ribs having a first and second short rib and a first and second long rib forming a generally rectangular shape, said plurality of ribs define a plurality of generally rectangular cavities in said bottom surface of said substrate, said substrate having a first rectangular rib extending from said bottom surface of said substrate near a first short outside edge of said substrate, said substrate having a second rectangular rib extending from said bottom surface of said substrate near a second short outside edge of said substrate, said substrate having a first and second finger extending towards a long outside edge of said substrate from an outside surface of one of said plurality of ribs;
   a cushioning material arranged over a top and front portion of said substrate;
   a cover material having a fastener with a first and second end, said first end of said fastener is attached to said cover material, said second end of said fastener is connected to a predetermined portion of said substrate; and
   a frame, said frame in contact with said bottom of said substrate.

2. The bus seat of claim 1 wherein said substrate having a groove or slot in said bottom surface thereof.

3. The bus seat of claim 2 wherein said second end of said fastener is connected to said groove or slot.

4. The bus seat of claim 2 further comprising a plurality of said grooves or slot arranged in a generally rectangular pattern in said bottom surface of said substrate.

5. The bus seat of claim 4 further comprising a plurality of generally circular orifices in said bottom surface of said substrate.

6. The bus seat of claim 5 wherein said circular orifices are arranged in a generally rectangular pattern and said circular orifices are arranged in an alternating pattern with said groove or slot, said groove or slot and said circular orifices are arranged near a periphery of said substrate outside of said plurality of ribs and said first rectangular and said second rectangular rib.

7. The bus seat of claim 2 wherein said fastener having a toothed arm and a base, said arm is secured within said groove or slot, said cover material is folded over one end of said base, a thread is sewn between a first portion of said cover material, said base, and a second portion of said cover material.

8. The bus seat of claim 7 further comprising a magnet and a carrier, said carrier sewn to said cover material, said magnet connected to a frame.

9. The bus seat of claim 7 further comprising a hook and loop device, said hook and loop device secured to said cover material and to a frame.

10. The bus seat of claim 1 wherein said fastener is a push-in device, or a J retainer system.

11. The bus seat of claim 1 wherein said substrate is an expanded polypropylene material, said plurality of generally rectangular cavities are aligned in a single linear row.

12. The bus seat of claim 1 wherein said substrate having a generally wing shape cross section, said wing shape having a generally rounded leading edge and a narrow trailing edge, a top surface of said substrate having a predetermined curve arranged between said leading edge and said trailing edge.

13. The bus seat of claim 1 wherein said first and second finger arranged at or near a mid point of said substrate, said first rectangular and said second rectangular rib are parallel to said first short and said second short outside edge, respectively.

14. The bus seat of claim 1 wherein said frame in contact with a surface of the bus, said substrate having a first notch arranged at a first corner and second notch arranged at a second corner.

15. The bus seat of claim 1 further comprising an attachment device arranged between and in contact with said frame and said cover material.

16. The bus seat of claim 1 wherein said fastener comprising a J retainer and a trim wire, said trim wire is secured to said substrate, said J retainer is sewn to said cover material, said J retainer interacts and engages with said trim wire.

17. The bus seat of claim 1 wherein said fastener having a washer, a toothed arm and a base, said washer is sewn to said cover material.

18. The bus seat of claim 1 further comprising an insert, said fastener is a hook and loop device, said insert is sewn to said cover material and a bottom loop piece of said hook and loop device, a top hook piece of said hook and loop device is secured to said substrate.

19. A bus seat for use in a school bus, said bus seat comprising:
a frame secured to a surface of the school bus;
an EPP base secured to and in contact with said frame, said EPP base having a continuous uniform wing shaped surface along an entire length of the bus seat;
a cushioning material arranged over a top and front portion of said EPP base;
a cover material arranged over a predetermined portion of said EPP base and said cushioning material; and
at least one fastener arranged between said cover material and said EPP base.

20. The bus seat of claim 19 wherein said fastener is a hook and loop device, a push-in device, or a J retainer system.

* * * * *